US008224371B1

United States Patent
Vargantwar (10) Patent No.: US 8,224,371 B1
(45) Date of Patent: Jul. 17, 2012

(54) MULTIMODE POWER CONTROL

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 262 days.

(21) Appl. No.: 12/642,913

(22) Filed: Dec. 21, 2009

(51) Int. Cl.
- G08C 17/00 (2006.01)
- H04B 7/00 (2006.01)
- H04B 17/00 (2006.01)
- H04B 1/00 (2006.01)
- H04B 7/185 (2006.01)
- H04J 1/16 (2006.01)
- H04J 3/16 (2006.01)
- H04W 4/00 (2009.01)

(52) U.S. Cl. ........... 455/522; 455/68; 455/69; 455/500; 370/318; 370/236; 370/328; 370/338; 370/468; 370/311

(58) Field of Classification Search ............... 455/522, 455/68, 69, 500; 370/318, 236, 328, 338, 370/468, 311
See application file for complete search history.

(56) References Cited

U.S. PATENT DOCUMENTS

| | | | |
|---|---|---|---|
| 7,548,760 B2* | 6/2009 | Vasudevan et al. | 455/522 |
| 7,885,239 B1* | 2/2011 | Oroskar et al. | 370/336 |
| 2004/0042460 A1* | 3/2004 | Gruhl et al. | 370/395.4 |
| 2004/0049596 A1* | 3/2004 | Schuehler et al. | 709/238 |
| 2005/0014524 A1* | 1/2005 | Lott et al. | 455/522 |
| 2006/0242319 A1* | 10/2006 | Sang et al. | 709/240 |
| 2007/0167183 A1* | 7/2007 | Vasudevan et al. | 455/522 |
| 2007/0173275 A1* | 7/2007 | Das et al. | 455/522 |
| 2008/0212472 A1* | 9/2008 | Musacchio et al. | 370/232 |
| 2008/0256239 A1* | 10/2008 | Gilde et al. | 709/226 |
| 2009/0129276 A1 | 5/2009 | Dendy | |
| 2010/0020756 A1* | 1/2010 | Kennedy | 370/329 |
| 2011/0013639 A1* | 1/2011 | Matthews et al. | 370/395.32 |

* cited by examiner

Primary Examiner — Bobbak Safaipour (57) ABSTRACT

Disclosed herein are methods that enable a sending entity and a receiving entity, operating in a wireless communication network, to adjust transmission power at the sending entity according to one of two power control modes. One method provides for a continuous power control mode in which the sending entity begins transmission of a particular data flow at a power level responsive to a most recently received power adjustment command. Another method provides for a perflow power control mode in which the sending entity begins transmission of a particular data flow at a power level responsive to the most recent transmission power level of the different particular data flow. Further methods provide for the receiving entity to dynamically instruct the sending entity in which power control mode to operate.

18 Claims, 6 Drawing Sheets

MULTIMODE POWER CONTROL

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, one or more of the BTS, BSC, MSC, and PDSN, may comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

Overview

Disclosed herein are methods that apply in a scenario in which two entities, a sending entity and a receiving entity, communicate with each other over an air interface. In a particular implementation, the sending entity may be a mobile station (also referred to as an access terminal (AT), whether fixedly positioned or moveable) and the receiving entity may be a cellular radio access network (RAN). In such an implementation, the sending entity (AT) sends data to the receiving entity (RAN) on a "reverse link". But the sending and receiving entities can take on other forms, even possibly being the opposite configuration. In such an implementation, the sending entity (RAN) sends data to the receiving entity (AT) on a "forward link".

The methods further apply in a scenario in which the sending entity transmits one or more segments of a first data flow, interleaved over time with one or more segments of another data flow. For example, the sending entity may transmit three data flows, A, B, and C, each broken into segments called frames and/or subframes, with the frames and/or subframes being interleaved with each other as in A1, B1, C1, A2, B2, C2, A3, B3, C3, etc. Other combinations are possible as well, such as different interleaving combinations, more or fewer data flows, and more or fewer subframes of each data flow. Preferably, the transmission of each data subframe occurs in a respective, defined unit of time.

Figure 1:
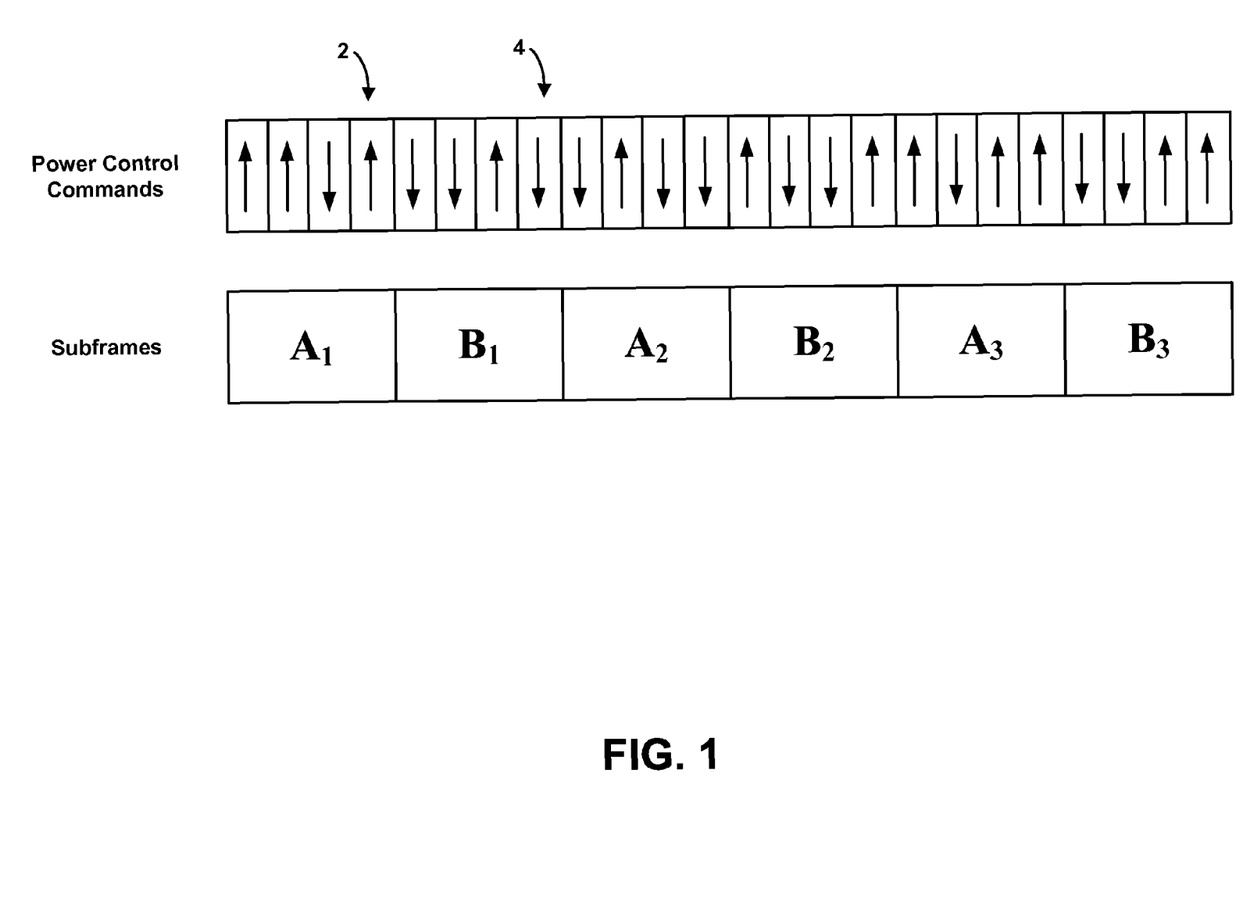
FIG. 1 illustrates an example of interleaved data flows and concurrently received power adjustment commands.

Further, in parallel with the sending entity's transmission of these interleaved data flows, the receiving entity may transmit power adjustment commands to the sending entity, providing the sending entity with one or more power adjustment commands in each subframe's unit of time. For instance, in each unit of time that the sending entity transmits a subframe of data, the receiving entity may transmit four power adjustment commands to the sending entity. FIG. 1 illustrates an example of two interleaved data flows, flow A, and flow B, each broken up into three subframes, A1, A2, A3, B1, B2, and B3. FIG. 1 also illustrates four power adjustment commands being transmitted in parallel with each subframe. Each power adjustment command may be a binary indication of whether the sending entity should increase or decrease transmission power used by the sending entity to transmit to the receiving entity. They are illustrated as up or down arrows in FIG. 1 for brevity's sake. The receiving entity may determine which power adjustment command (i.e., a power-up command or a power-down command) to send based on an analysis of the strength of signals that the receiving entity receives from the sending entity.

It should be understood that the sending entity transmits data flows to the receiving entity and receives power adjustment commands from the receiving entity. Likewise, the receiving entity receives data flows from the sending entity and transmits power adjustment commands to the sending entity.

According to the present methods, power control in this scenario can have at least two power control modes (or states), one referred to as a continuous power control mode and one referred to as a per-flow power control mode.

In the continuous power control mode, the sending entity applies received power adjustment commands continuously across the interleaved flows. For example, when the sending entity transitions from transmitting a subframe of a first data flow to transmitting a subframe of a second data flow, the sending entity begins transmission of the second data flow at a transmission power level responsive to the most recently received power adjustment command, which would have been transmitted by the receiving entity with respect to the first flow. This can be illustrated in FIG. 1. When the sending entity begins transmission of subframe A2 in the continuous power control mode, the sending entity begins the transmission at a power level responsive to the most recently received power adjustment command (power adjustment command 4), which was sent by the receiving entity with respect to a different data flow (data flow B). Thus, in this mode, power control is continuous and spans multiple interleaved data flows.

In the per-flow power control mode, on the other hand, when the sending entity transitions from transmitting a subframe of a first data flow to transmitting a subframe of a second data flow, the sending entity begins transmission of the second data flow at a transmission power level responsive to the most recent transmission power level of that second data flow. For example, referring again to FIG. 1, when the sending entity begins transmission of subframe A2 in the per-flow mode, the sending entity begins the transmission at a power level responsive to the most recent transmission power level of subframe A1 (i.e., the most recent transmission of the same data flow). A transmission power level responsive to the most recent transmission power level of the same flow may simply mean the power level of the most recent transmission of the same flow, or alternatively, it may mean a power level responsive to the most recent power adjustment command received during the most recent transmission of the same data flow. Thus, in this mode, the sending entity applies power adjustment commands separately per flow rather than continuously across the interleaved flows. Adjustments of power applied by the sending entity with respect to a given data flow would therefore not directly impact transmission power used by the sending entity for transmission of other data flows.

At certain times it may be advantageous for the sending and receiving entities to operate in the continuous power control mode, while at other times it may be advantageous for the sending and receiving entities to operate in the per-flow power control mode. Thus, disclosed herein are methods for the receiving entity to dynamically instruct the sending entity as to whether the sending entity should operate in the continuous power control mode or the per-flow power control mode.

In one such method, the receiving entity provides a predefined command (e.g., in a control channel message) instructing the sending entity to operate in one power control mode or the other. In one specific embodiment, the predefined command may take the form of the absence of a power adjustment command expected by the sending entity. For instance, if the receiving entity provides a continuous series of power adjustment commands, with a particular number of such power adjustment commands occurring in each unit of time in which the sending entity transmits a given subframe to the receiving entity, the receiving entity may selectively omit one of the power adjustment commands in order to signal to the sending entity to operate in the per-flow power control mode for the next subframe. Whereas, the receiving entity may transmit each power adjustment command (i.e., not omit any power adjustment commands) expected by the sending entity during transmission of a particular subframe in order to signal to the sending entity to operate in the continuous power control mode for the next subframe. Alternatively, the absence of a power adjustment command can signal to the sending entity to operate in the continuous power control mode, whereas including each power adjustment command can signal to the sending entity to operate in the per-flow power control mode. Other mechanisms for dynamically instructing the sending entity to switch power control modes are possible as well.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

DETAILED DESCRIPTION

The present methods will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. It should be understood that the present methods can apply to other wireless voice and data protocols including, without limitation, IS-95, GSM, iDEN, TDMA, AMPA, GPRS, UMTS, EDGE, WiMAX (e.g., IEEE 802.16), LTE, microwave, satellite, MMDS, Wi-Fi (e.g., IEEE 802.11), and Bluetooth or others now known or later developed, which, together with IS-856 and IS-2000 are considered herein, individually or in combination, to comprise a CDMA family of protocols.

Figure 2:
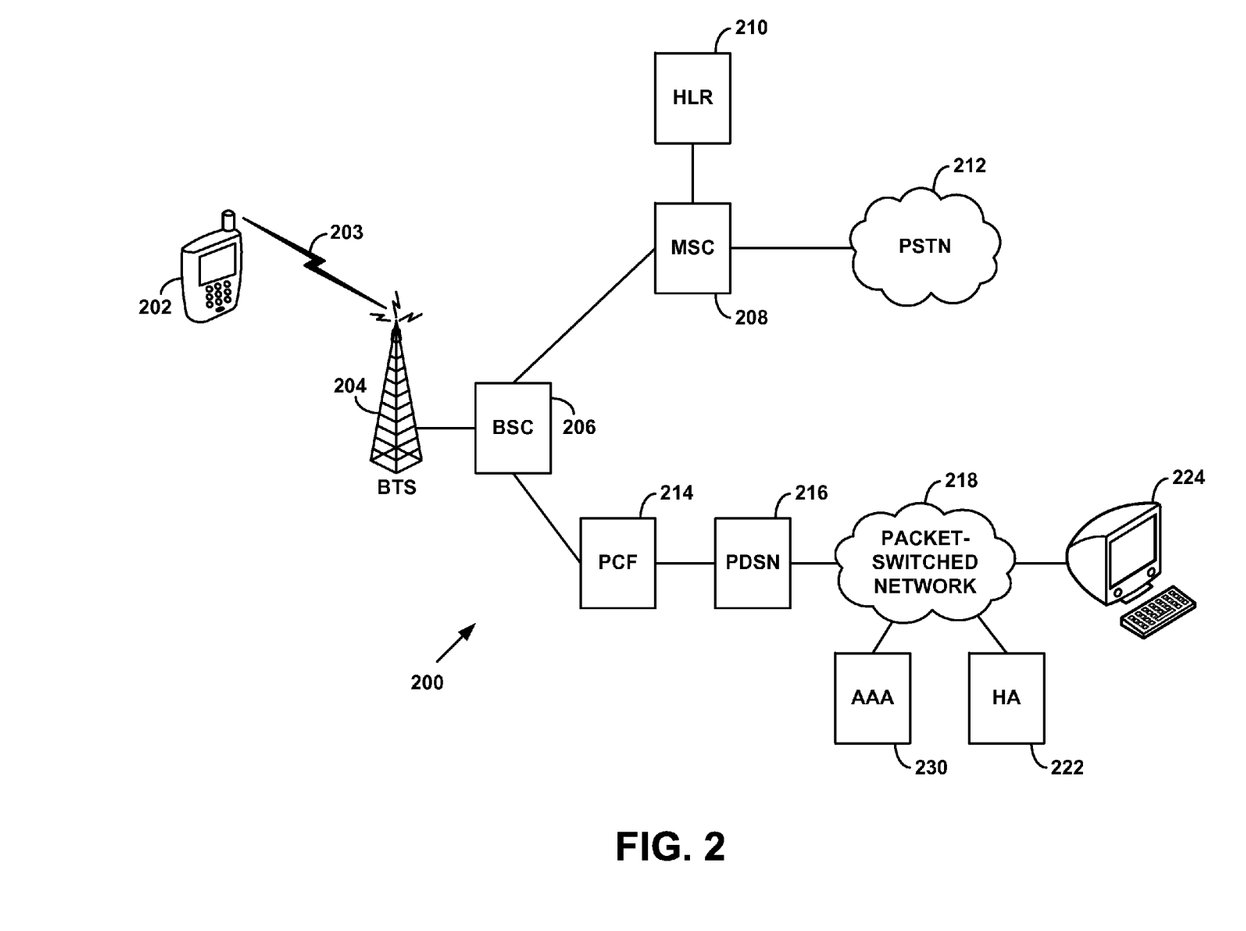
FIG. 2 is a simplified block diagram of a wireless communication system in which an example embodiment of intelligent power control can be employed.

FIG. 2 illustrates a simplified block diagram of a wireless communication system 200 in which an example embodiment of intelligent power control can be employed. AT 202 communicates over an air interface 203 with a BTS 204, which is then coupled or integrated with a BSC 206. Transmissions over air interface 203 from BTS 204 to AT 202 represent the forward link to the access terminal (also referred to herein alternatively as the forward link from the base station, and as "the AT's forward link"). Hence, on the forward link, the BTS 204 is a "sending entity" and the AT 202 is a "receiving entity". Transmissions over interface 203 from AT 202 to BTS 204 represent the "reverse link" (also referred to herein as "the AT's reverse link"). Hence, on the reverse link, the BTS 204 is a receiving entity and the AT 202 is a sending entity.

BSC 206 is connected to MSC 208, which acts to control assignment of air interface traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air interface traffic channel, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention, and it will be appreciated that numerous variations on the illustrated arrangement are possible. Further, the network components that make up a wireless communication system such as system 200 may be implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 may comprise a user-interface, I/O components, a transceiver, a communication interface, a tone detector, a processing unit, and data storage, all of which may be coupled together by a system bus or other mechanism. As such, AT 202, and air interface 203, as parts of system 200, are representative of exemplary means of implementing and carrying out the various functions, steps, and procedures described herein.

Throughout this description, the terms "base station" or "RAN" will be used to refer to any Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

As described above, air interface communications are divided into forward link communications, which are those passing from the RAN to the AT, and reverse link communications which are those passing from the AT to the RAN. According to some protocols, data sent on either the forward link or the reverse link is first assembled into units called data frames, which are then encoded for transmission. Transmission of the data frames from the sending entity to the receiving entity occurs at regular intervals, with one possible interval being on the order of 20 milliseconds (although other frame intervals can be used). The frames can be further divided into smaller units called subframes. Different frames can be broken into different numbers of subframes, typically ranging from 2-6 subframes per frame. Some subframes may have more error correction than others, and some subframes may contain the same data as others for sake of redundancy.

Each data frame corresponds to a particular data flow that the sending entity transmits to the receiving entity, and each data flow may include one or more data frames. At various times, the sending entity could have multiple data flows to transmit to the receiving entity. Each data flow could correspond to a different data application running on a particular AT. Alternatively, some data flows could correspond to transmissions from the same data application but at different data rates. In either case, the sending entity may transmit all of the frames of a particular data flow before moving on to transmit frames of a different data flow. Or, the sending entity could interleave the frames, or subframes, of one data flow with the frames, or subframes, of another data flow. For example, if a sending entity has three transmissions corresponding to three different data flows to send to a receiving entity, as in A, B, and C, the sending entity could interleave the subframes of each data flow together before transmitting them to the receiving entity, as in A1, B1, C1, A2, B2, C2, A3, B3, C3. Other combinations are possible as well, such as different interleaving combinations, more or fewer data flows, and more or fewer subframes of each data flow.

As a result of imperfect transmission, some frames received by the receiving entity may contain errors and therefore will not be decoded correctly. Other frames, ideally the majority of them, will be received without errors. The receiving entity can compute a ratio of (i) the number of frames not decoded correctly (due to a frame error or otherwise) in a given period of time to (ii) the total number of frames received during the same period of time. This ratio is called the frame error rate (FER). The FER is an indication of the RF conditions of the forward and/or reverse link, and consequently the quality of service provided over the respective link. For instance, frame errors may manifest as lost audio samples, which in turn may cause choppy or distorted audio output when played out by a receiving device. Similarly, frame errors may represent packet-data loss that may result in retransmissions and lower overall throughput. In general, the higher the FER, the lower the quality of service will be, and vice versa. For a given set of physical conditions underlying communications between a base station and an AT, the higher the transmission power on the link (forward or reverse), the lower the FER will be. Consequently, the quality of service provided on a link can be adjusted and/or controlled by adjusting the transmission power used on the link In addition to computing an FER, the receiving entity can maintain a "termination target" for each data transmission. A termination target is the number of subframes of a particular data frame that the receiving entity expects to be transmitted in order for the receiving entity to successfully decode the entire data frame. Typically, the termination target is set on a data flow-specific basis. For example, one data flow might have one termination target, while another data flow might have another, different, termination target. The termination targets may be derived by the receiving entity, based on the data rates of the different data flows. For example, a data flow with a particularly high data rate may have a particularly low termination target. This is because subframes of high data rate data flows typically have more data bits and fewer error correction bits than subframes of low data rate data flows. As a result, the high data rate subframes may be transmitted at a higher transmission power. The particularly low termination target for high data rate subframes results from the assumption that due to the higher transmission power, fewer subframes will be necessary in order for the receiving entity to successfully decode the data frame.

Likewise, subframes of a low data rate data flow may have a particularly high termination target. This is because subframes of low data rate data flows typically have less data bits and more error correction bits than subframes of high data rate data flows. As a result, the low data rate subframes may be transmitted at a lower transmission power. The particularly high termination target for low data rate subframes results from the assumption that due to the lower transmission power, more subframes will be necessary in order for the receiving entity to successfully decode the data frame.

Since redundancy is built in to the subframes, the receiving entity can successfully decode a particular data frame even though it may have taken more than the termination target number of subframes to do so. However, the receiving entity may only allow up to a maximum number of subframes above and beyond the termination target number of subframes to be transmitted before the receiving entity considers the frame to have been unsuccessfully decoded. For example, the termination target of a particular data flow may be four subframes, and the receiving entity may allow only an additional three subframes to be transmitted above and beyond the termination target number of four subframes. Therefore, for any given data frame corresponding to the particular data flow, if the given data frame is not successfully decoded after transmission of seven subframes, transmission of the given data frame is considered a failure.

In order to keep the FER at or near a target FER, the transmission power of the sending entity is adjusted according to one of two adaptive power-control modes (or states) that both the receiving entity and the sending entity operate in. In the first mode, called a "continuous power control mode," the receiving entity maintains a global threshold level signal-to-noise ratio (SNR), to continually compare to the SNR of received transmissions. The receiving entity makes this comparison continually across multiple interleaved data flows, and responsively issues to the sending entity corresponding power adjustment commands. In the second mode, called a "per-flow power control mode," the receiving entity maintains a separate data flow-specific threshold SNR level for each individual data flow. The receiving entity compares received transmission power levels of each individual data flow to the appropriate data flow-specific threshold SNR level, and responsively issues corresponding power adjustment commands.

The SNR may be a measurement made in terms of $E_b/N_0$, where $E_b$ is the energy per bit of the signal received by the receiving entity, and the $N_0$ is the noise power spectral density. The term SNR may refer to the previous definition, or it may simply refer to a power level (without the ratio to noise calculation). The terms "power level", "SNR", and "$E_b/N_0$" are used interchangeably throughout this description.

In the continuous power control mode, during transmission of each subframe, the receiving entity makes several comparisons of the received power level to the global threshold power level. For example, referring to FIG. 1, the receiving entity may make four comparisons per subframe (although more or less comparisons per subframe are possible as well). For each comparison indicating that the received power level is greater than the global threshold power level, the receiving entity transmits to the sending entity a power-down command. And for each comparison indicating that the received power level is less than the global threshold level, the receiving entity transmits to the sending entity a power-up command. A power adjustment command (e.g., a power-up command or a power-down command) may take the form of a binary value of a particular bit in a control channel message sent by the receiving entity (although the power adjustment commands are shown as up or down arrows in FIG. 1 for sake of brevity). In one example, a binary value of 1 may translate to a power-up command, while a binary value of 0 may translate to a power-down command.

In the continuous power control mode, the power adjustment at the sending entity is applied in terms of gain relative to the current power level, and measured in dB. For each power-up command the sending entity receives, the sending entity responsively increases the gain by a small amount (typically 1 dB or less). And for each power-down command the sending entity receives, the sending entity responsively decreases the gain by the same small amount. After receiving a power adjustment command in the continuous power control mode, the very next transmission by the sending entity will be at the adjusted power level.

Figure 3:
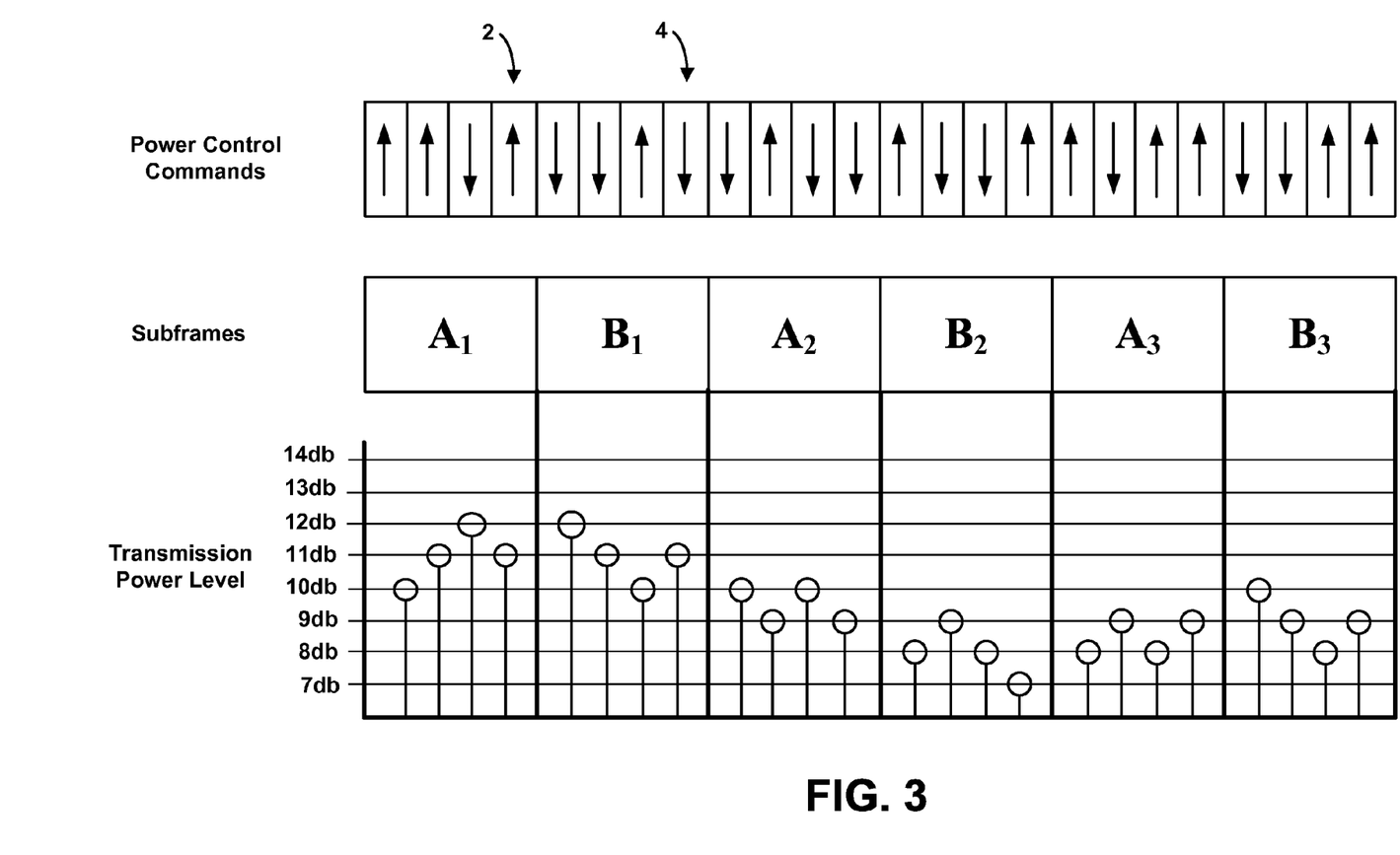
FIG. 3 illustrates an example of power control for interleaved subframes of different data flows according to the continuous power control mode.

FIG. 3 illustrates an example of transmission power control of the interleaved subframes of FIG. 1 according to the continuous power control mode. In this example, transmission of subframe A1 (the first subframe of data flow A) starts at 10 dB, and responsive to the first power adjustment command, the sending entity adjusts the transmission power up one increment to 11 dB. Continuing, the sending entity adjusts the transmission power up one increment, and then down one increment, responsive to the next two power adjustment commands. When the sending entity receives power adjustment command 2, the sending entity responsively increases the transmission power level and begins the next transmission at that increased power level. Therefore, in the continuous power control mode, even when the sending entity switches data flows and begins transmission of a different data flow, such as subframe B1 (the first subframe of data flow B), the transmission begins at a power level responsive to the most recently received power adjustment command. Thus, in this mode, power control is continuous and spans multiple interleaved data flows.

The receiving entity may adjust the global threshold level up or down based on a variety of different computations. One such computation is an FER computation. The receiving entity may compute the FER in consecutive windows, where each window is an integer number of frames. An example window size is 20 frames, although more or less frames could be used. Thus, in each window, FER may be expressed as the number of frames with errors (the numbers of frames that could not be successfully decoded) divided by the number of frames per window. For each window, the receiving entity compares the computed FER with a target FER (TFER). If the computed FER is less than the TFER, the base station decreases the global threshold level. Conversely, if the computed FER is greater than TFER, the base station increases the global threshold level.

Another such computation is a termination target computation. For each data frame that meets the termination target, i.e., for each frame that is successfully decoded after a number of subframes less than or equal to the termination target, the receiving entity may responsively decrease the global threshold power level. For each data frame that does not meet the termination target, i.e., for each frame that is not successfully decoded by the termination target number of subframes, the receiving entity may responsively increase the global threshold level. The receiving entity may use one of the above computations either alone or in combination with the other, as a basis for adjusting the global threshold level. Other bases for adjusting the global threshold level may be used as well.

As an alternative to operating in the continuous power control mode, the sending and receiving entities may operate in the second of the two modes, the per-flow power control mode. In the per-flow power control mode, the receiving entity maintains a separate, data flow-specific, threshold power level for each individual data flow. For example, when the receiving entity is receiving from the sending entity a subframe of data flow A, the receiving entity compares the received power level to the data flow A threshold power level, and transmits to the sending entity appropriate power adjustment commands. When the sending entity switches transmissions and transmits a subframe of data flow B, the receiving entity accordingly switches threshold power levels, compares the received power level to the data flow B threshold power level, and transmits to the sending entity appropriate power adjustment commands.

In the per-flow power control mode, power adjustment at the sending entity is applied in terms of gain relative to the current power level, in the same manner as it is applied in the continuous power control mode. When the sending entity switches data flows, transmission of the new data flow will begin at a power level responsive to the most recent transmission power level of the new data flow. A transmission power level responsive to the most recent transmission power level of the same flow may simply mean the power level of the most recent transmission of the same flow, or alternatively, it may mean a power level responsive to the most recent power adjustment command received during the most recent transmission of the same data flow. If the transmission of the new data flow is the first such transmission of the new data flow (i.e., there is no most recent transmission power level of the new data flow), the transmission of the new data flow may begin at some default power level.

Figure 4:
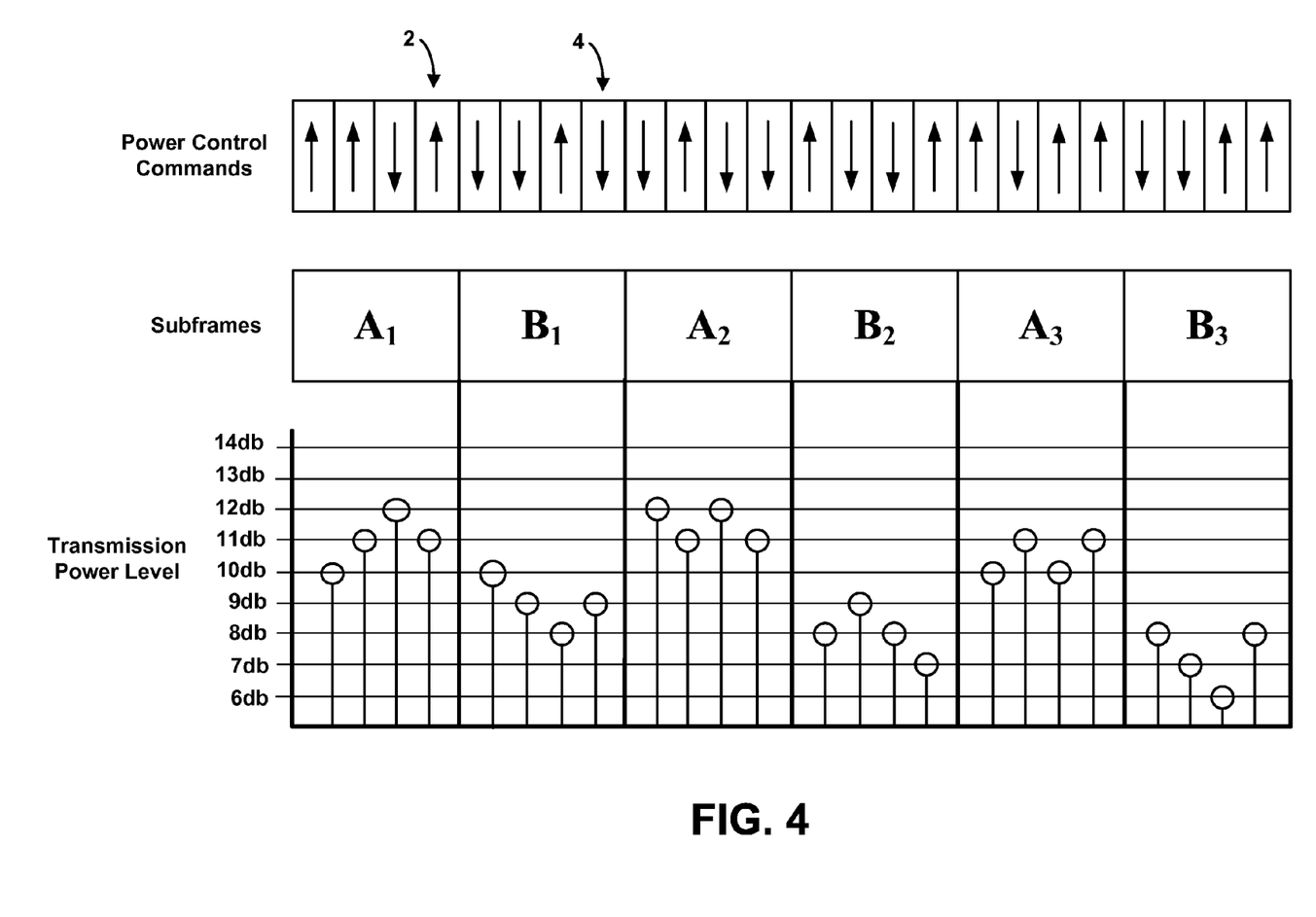
FIG. 4 illustrates an example of power control for interleaved subframes of different data flows according to the per-flow power control mode.

FIG. 4 illustrates an example of transmission power control of the interleaved subframes of FIG. 1 according to the per-flow power control mode. In this example, transmission of subframe A1 starts at 10 dB and is adjusted according to the power adjustment commands received during transmission of subframe A1. When the sending entity receives power adjustment command 2, the sending entity does not responsively adjust the current transmission power, because the very next transmission will be of a different data flow. According to the per-flow power control mode, responsive to power adjustment command 2, the sending entity stores to memory what the adjusted power level would be, which in this example is 12 dB.

The sending entity then begins transmission of the new data flow, data flow B, at a default power level (since this is the first such transmission of data flow B, and there is no most recent transmission power level of data flow B). In this example the default power level is 10 dB, although different default power levels are possible as well. The sending entity continues power control with respect to data flow B, responsive to the power adjustment commands received during transmission of subframe B1. When the sending entity receives power adjustment command 4, the sending entity stores to memory an adjusted power level responsive to power adjustment command 4, which in this example is 8 dB.

When the sending entity switches back to transmit a new subframe of data flow A, the sending entity recalls from memory the data flow A saved power level (i.e., the power level responsive to the most recent power adjustment command with respect to data flow A), which in this example is 12 dB. The sending entity then begins transmission of subframe A2 at the recalled power level, 12 dB.

The receiving entity may adjust each data flow specific threshold power level based on the termination target computation for each data flow. For each data frame pertaining to a specific data flow that meets that flow's termination target, the receiving entity may responsively decrease the threshold power level of that specific data flow. For each data frame pertaining to a specific data flow that does not meet that data flow's termination target, the receiving entity may responsively increase the threshold power level of that specific data flow. Thus, adjustments made to one data flow's threshold power level, will not impact the threshold power levels of other data flows, and therefore will not affect the actual transmission power levels of the other data flows.

At times, it may be advantageous for the sending and receiving entity to operate in the continuous power control mode, while at other times, it may be advantageous for the sending and receiving entity to operate in the per-flow power control mode. One advantage to operating in the continuous power control mode is when the computed FER is too far above or below the TFER, adjusting the threshold power level of all data flows can bring quickly bring the computed FER closer to the TFER. One advantage to operating in the per-flow power control mode is that power usage is more efficient in this mode. Each individual data flow specific threshold power level approaches the optimum level since each individual threshold level is adjusted only in response to the performance of the individual data flow. Therefore, according to the present method, the receiving entity may monitor various trigger events, and responsive to one of the trigger events, initiate a switch from the present power control mode, to the other power control mode. Trigger events may include determining that a computed FER is at least a threshold amount below the TFER, determining that a computed FER is at least a threshold amount above the TFER, and determining that a computed FER is within a threshold range of the TFER. Other trigger events are possible as well.

For example, if the sending and receiving entities are operating in the continuous power control mode, and the receiving entity determines that a computed FER is within a threshold range (e.g., 0.5%, in either direction) of the TFER (e.g., 1.0%), the receiving entity may switch from the continuous power control mode to the per-flow power control mode, and accordingly instruct the sending entity to switch power control modes. Or, if the sending and receiving entities are operating in the per-flow power control mode, and the receiving entity determines that either (i) the computed FER is higher than a threshold amount (e.g., 0.5%) above the TFER (e.g., 1.0%), or (ii), the computed FER is lower than a threshold amount (e.g., 0.5%) below the TFER (e.g., 1.0%), then the receiving entity may switch from the per-flow power control mode to the continuous power control mode, and accordingly instruct the sending entity to switch power control modes.

The receiving entity may instruct the sending entity to switch power control modes by providing a predefined instruction to the sending entity. The predefined instruction could take the form of a specific control channel message. Or, the receiving entity could code the predefined instruction into an existing control channel message. For example, if the receiving entity provides a continuous series of power adjustment commands, with a particular number of such power adjustment commands occurring in each unit of time in which the sending entity transmits a given subframe to the receiving entity, the receiving entity may selectively omit one of the power adjustment commands in order to signal to the sending entity to operate in the per-flow power control mode for the next subframe. Whereas, the receiving entity may transmit each power adjustment command (i.e., not omit any power adjustment commands) expected by the sending entity during transmission of a particular subframe in order to signal to the sending entity to operate in the continuous power control mode for the next subframe.

To implement the absence of a power adjustment command, or to transmit a "blank" power adjustment command, the receiving entity may omit the sending entity's device address in the control channel message carrying the power adjustment commands. As an example, a RAN may omit an AT's MAC address from the RPC field in a given timeslot as an indication to that AT that power control for the next subframe is being conducted in the per-flow mode.

Figure 5:
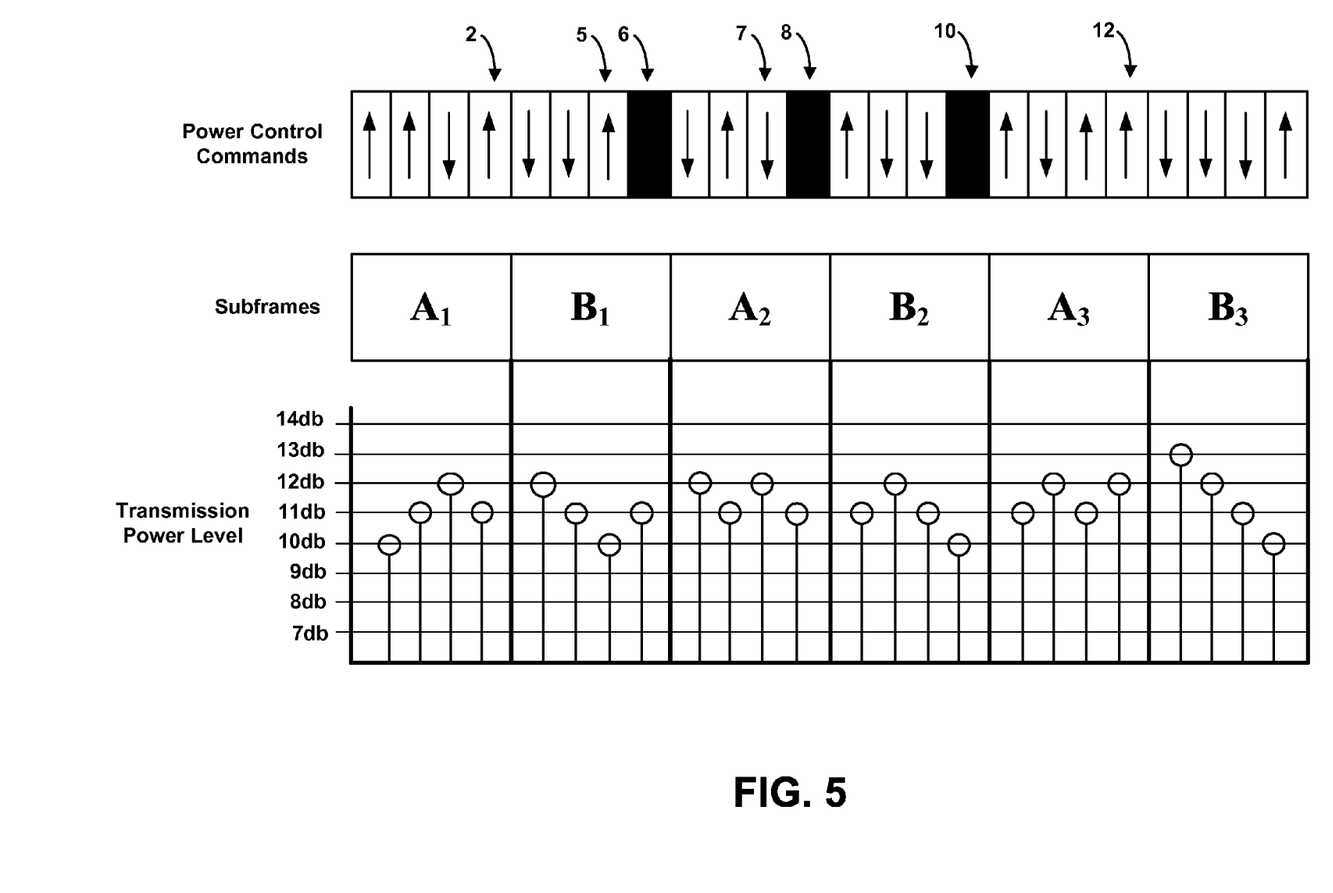
FIG. 5 illustrates an example of a mechanism for switching between the continuous power control mode and the per-flow power control mode according to one embodiment.

FIG. 5 illustrates an example of dual-mode power control. In this example, the sending entity begins transmission of subframe A1 at the default power level, 10 dB, and operates according to the continuous power control mode. Transmission continues until power adjustment command 2 is received, whereby the sending entity responsively adjusts the current transmission power up one increment, and begins transmission of subframe B1 at the adjusted power level, 12 dB. Transmission continues until blank 6 is received. This blank 6 indicates to the sending entity that the next subframe is to be transmitted according to the per-flow power control mode. Therefore, the sending entity begins transmission of the next subframe, A2, at a power level responsive to the most recent transmission power level of data flow A, which in this example is 12 dB (responsive to power adjustment command 2). Transmission continues until blank 8 is received, indicating that subframe B2 is to be transmitted according to the per-flow power control mode. Therefore, the sending entity begins transmission of subframe B2 at a power level responsive to the most recent transmission power level with respect to data flow B, which in this example is 11 dB (responsive to power adjustment command 5).

Power control continues in this manner, through subframe A3, in which the sending entity is again instructed to operate in the per-flow power control mode per blank 10. After transmitting subframe A3 according to the per-flow power control mode, the sending entity receives power adjustment command 12 indicating to the sending entity to power up from the 12 dB power level. Since the sending entity received each expected power adjustment command during the transmission of subframe A3, transmission of the next subframe (subframe B3) will be conducted according to the continuous power control mode. Transmission thusly begins at 13 dB, responsive to power adjustment command 12.

Figure 6:
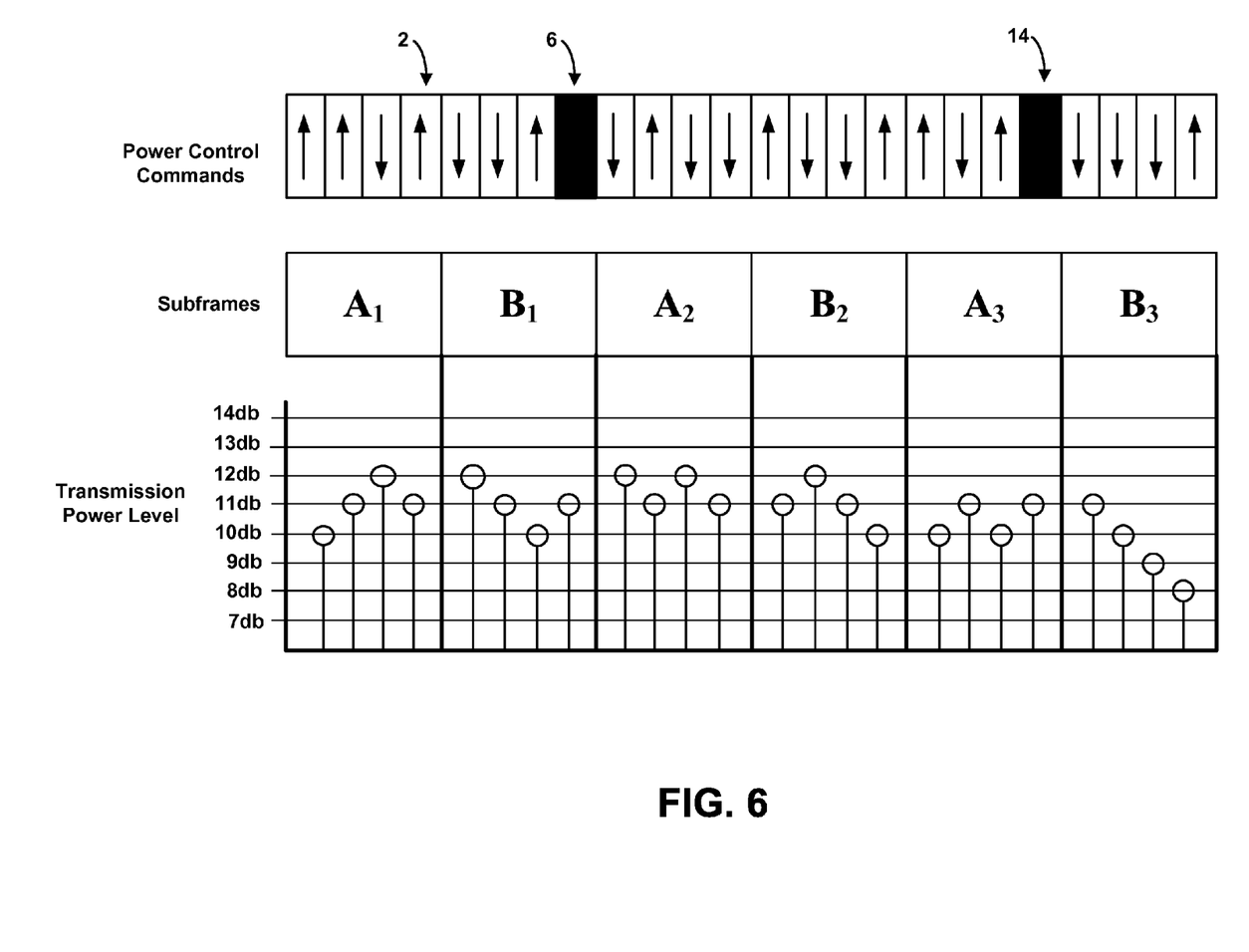
FIG. 6 illustrates an example of a mechanism for switching between the continuous power control mode and the per-flow power control mode according to another embodiment.

In an alternative embodiment of the present method, a separate blank for each subframe that the receiving entity intends to operate in the per-flow mode for may not necessary. For example, the first blank a sending entity receives may indicate to the sending entity to operate in the per-flow mode for each upcoming subframe until another blank is received. Thereafter, each blank may simply indicate to the sending entity to switch power control modes from the current mode of operation, rather than indicating to operate in one particular mode or the other. This is illustrated in FIG. 6, where the sending entity begins transmission of subframe A1 in the continuous power control mode. The sending entity remains in the continuous power control mode until the sending entity receives blank 6, which indicates to the sending entity to switch power control modes. Since the sending entity is currently operating in the continuous mode, switching modes constitutes operating in the per-flow mode. The sending entity then operates in the per-flow mode until a next blank 14 is received. Thereafter, the sending entity switches back to the continuous mode, and operates in the continuous mode until another blank is received.

It should be noted that an instruction to switch power control modes, such as blank 14 transmitted from the receiving entity to the sending entity, may be transmitted in place of any of the power adjustment commands expected by the sending entity.

Exemplary embodiments of the present invention have been described above. Those skilled in the art will understand, however, that changes and modifications may be made to the embodiments described without departing from the true scope and spirit of the present invention, which is defined by the claims.

I claim:

1. A power control method comprising:
   a first entity transmitting a plurality of interleaved data flows over an air interface to a second entity;
   during the transmitting, the first entity operating in a given one of two power control modes, wherein the power control modes are a continuous power control mode and a per-flow power control mode;
   while operating in the given power control mode, the first entity receiving from the second entity an instruction to operate in the other of the two power control modes; and
   responsive to the received instruction, the first entity transitioning from operating in the given power control mode to operating in the other of the two power control modes,
   wherein each data flow is divided into a respective plurality of segments and wherein transmitting the interleaved data flows over the air interface comprises outputting onto the air interface the segments of at least one of the flows interleaved over time with the segments of at least another one of the flows, including outputting a first segment of a first data flow followed immediately by a second segment of a second data flow,
   wherein operating in the given power control mode comprises receiving from the second entity a sequence of power adjustment commands over time, and adjusting power for transmission of the interleaved data flows in response to each of the received power adjustment commands,
   wherein operating in the continuous power control mode comprises, when beginning to transmit the second segment, using a transmission power level established by adjustment from a most recent transmission power level of the first data flow, and
   wherein operating in the per-flow power control mode comprises, when beginning to transmit the second segment, using a transmission power level established by adjustment from a most recent transmission power level of the second data flow rather than from a most recent transmission power level of the first data flow.

2. The method of claim 1, wherein the instruction to operate in the other of the two power control modes comprises an absence of an expected power adjustment command.

3. The method of claim 2, wherein the first entity has a device address, and wherein the absence of an expected power adjustment command comprises an absence of the first entity's device address in a power control adjustment communication.

4. The method of claim 1, wherein the instruction to operate in the other of the two power control modes comprises a presence of each of a plurality of power adjustment commands expected to be received from the second entity during transmission of a particular segment.

5. The method of claim 1, wherein using a transmission power level established by adjustment from a most recent transmission power level of the first data flow comprises beginning to transmit the second segment using a transmission power level established by incrementally adjusting, based on a most recently received power adjustment command, a most recent transmission power level of the first data flow.

6. The method of claim 1, wherein using a transmission power level established by adjustment from a most recent transmission power level of the second data flow rather than from a most recent transmission power level of the first data flow comprises:

recalling from memory a most recently adjusted transmission power level of the second data flow; and beginning to transmit the second segment using the recalled transmission power level.

7. The method of claim 6, wherein the most recently adjusted transmission power level of the second data flow is a power level of a most recent transmission of the second data flow.

8. The method of claim 6, wherein the most recently adjusted transmission power level of the second data flow is a transmission power level established by incrementally adjusting a most recent transmission power level of the second data flow based on a most recent power adjustment command received during transmission of the second data flow.

9. The method of claim 1, wherein the first entity is a wireless communication device (WCD), and wherein the second entity is a radio access network (RAN).

10. A power control method operable by a first entity to control transmission power of a second entity served by the first entity, the method comprising:

the first entity receiving an interleaved plurality of data flows transmitted over an air interface from the second entity;

during the receiving, the first entity operating in a given one of two power control modes, wherein the power control modes are a continuous power control mode and a per-flow power control mode; and while operating in the given power control mode, the first entity transitioning from operating in the given power control mode to operating in the other of the two power control modes, and the first entity transmitting to the second entity an instruction directing the second entity to transition power control modes as well, wherein each data flow is divided into a respective plurality of segments and wherein receiving the interleaved data flows over the air interface comprises receiving via the air interface the segments of at least one of the data flows interleaved over time with the segments of at least another one of the data flows, including a first segment of a first data flow followed immediately by a second segment of a second data flow, wherein operating in the given power control power control mode comprises generating and sending to the second entity a sequence of power adjustment commands each based on evaluation of quality of data received by the first entity from the second entity, each power adjustment command causing the second entity to adjust transmission power used by the second entity for transmission to the first entity, wherein operating in the continuous power control mode comprises sending to the second entity the sequence of power adjustment commands in response to comparisons of received transmission power levels of the first and second segments to a single global threshold power level; and wherein operating in the per-flow power control mode comprises sending to the second entity during transmission of the first segment a first sequence of power adjustment commands in response to comparisons of received transmission power levels of the first segment to a first flow-specific power level, and sending to the second entity during transmission of the second segment a second sequence of power adjustment commands in response to comparisons of received transmission power levels of the second segment to a second flow-specific power level.

11. The method of claim 10, wherein transmitting to the second entity an instruction directing the second entity to transition power control modes comprises selectively omitting a power adjustment command expected by the second entity.

12. The method of claim 11, wherein the second entity is a device, and wherein selectively omitting a power adjustment command expected by the second entity comprises omitting an address of the device in a power adjustment command communication.

13. The method of claim 10, wherein transmitting to the second entity an instruction directing the second entity to transition power control modes comprises sending each of a plurality of power adjustment commands that are expected by the second entity to be sent during transmission of a particular segment.

14. The method of claim 10, wherein the first entity transitions from operating in the given power control mode to operating in the other of the two power control modes in response to determining whether a transmission error rate is within a threshold range of a target transmission error rate.

15. The method of claim 14, wherein the transmission error rate is a frame error rate.

16. The method of claim 10, wherein the given power control mode is the continuous power control mode, and wherein the first entity transitions from operating in the continuous power control mode to operating in the per-flow power control mode in response to determining that a transmission error rate is within a threshold amount of a target transmission error rate.

17. The method of claim 10, wherein the given power control mode is the per-flow power control mode, and wherein the first entity transitions from operating in the per-flow power control mode to operating in the continuous power control mode in response to determining that a transmission error rate is not within a threshold amount of a target transmission error rate.

18. The method of claim 10, wherein the first entity is a radio access network (RAN), and wherein the second entity is a wireless communication device (WCD).

* * * * *